US007110955B1

(12) United States Patent
Barhnart et al.

(10) Patent No.: US 7,110,955 B1
(45) Date of Patent: Sep. 19, 2006

(54) DEVICE FOR AUTOMATING BILLING REIMBURSEMENT

(75) Inventors: Matthew D. Barhnart, Cambridge, MA (US); Stephen S. Hau, Cambridge, MA (US); Yuri Ostrovsky, Cambridge, MA (US); MinPont Chien, Cambridge, MA (US)

(73) Assignee: PatientKeeper, Inc., Newton, MA (US)

( * ) Notice: Subject to any disclaimer, the term of this patent is extended or adjusted under 35 U.S.C. 154(b) by 0 days.

(21) Appl. No.: 09/356,543

(22) Filed: Jul. 19, 1999

Related U.S. Application Data

(60) Provisional application No. 60/100,333, filed on Sep. 15, 1998, provisional application No. 60/093,446, filed on Jul. 20, 1998.

(51) Int. Cl.
*G06F 17/60* (2006.01)
(52) U.S. Cl. .................................. 705/3; 707/6; 707/9
(58) Field of Classification Search .............. 705/1–10; 707/1–104.1
See application file for complete search history.

(56) References Cited

U.S. PATENT DOCUMENTS

| 5,325,293 A | * | 6/1994 | Dorne ............................. 705/3 |
| 5,392,390 A | | 2/1995 | Crozier |
| 5,497,339 A | | 3/1996 | Bernard |
| 5,823,948 A | * | 10/1998 | Ross, Jr. et al. ................. 705/2 |
| 5,845,255 A | * | 12/1998 | Mayaud ........................... 705/3 |
| 5,857,201 A | | 1/1999 | Wright, Jr. et al. |
| 5,867,688 A | | 2/1999 | Simmon et al. ............. 395/500 |
| 5,867,821 A | * | 2/1999 | Ballantyne et al. ............ 705/2 |
| 6,000,000 A | | 12/1999 | Hawkins et al. |
| 6,151,581 A | | 11/2000 | Kraftson et al. |
| 6,154,726 A | * | 11/2000 | Rensimer ....................... 705/2 |
| 6,202,060 B1 | | 3/2001 | Tran |
| 6,308,201 B1 | | 10/2001 | Pivowar et al. |

FOREIGN PATENT DOCUMENTS

WO          WO 99/22330          5/1999

OTHER PUBLICATIONS

"Franklin's New SmartCoder™ Finds Medical Codes Instantly; Updatable Electronic Book Cuts Billing Time in Doctor's Offices," PRNewswire, Franklin Electronic Publishers, Inc., (Apr. 19, 1995).
Davey, T. "Faster, Smarter, Smaller," *Information Week*, Nov. 1997, pp. 125-128.
"Oracle Brings Enterprise Data Management Capabilities to PDA and Handheld PC Platforms," PR Newswire, Mar. 1998, pp. 1-3.
Carpenter, J. "Handheld Healtcare," *Health Management Technology*, vol. 17, No. 13, Dec. 1996, pp. 26-28.
"In the Hands of Physicians," *Managed Care Marketing*, vol. 1, No. 4, Oct. 1995, pp. 28-30.

* cited by examiner

*Primary Examiner*—Charles Rones
*Assistant Examiner*—Neveen Abel-Jalil
(74) *Attorney, Agent, or Firm*—Hamilton, Brook, Smith & Reynolds, P.C.

(57) ABSTRACT

An apparatus for automating billing reimbursement includes an electronic handheld processing device that displays patient demographic information, billing codes and guideline information. The physician selects patient information and is able to sort the patient information by different categories. The physician, after examination of the patient, inputs a billing code which is outputted to an interface device for distribution to an information system for providing medical bills.

13 Claims, 16 Drawing Sheets

| Select Patient | Sun 1/24/99 |
|---|---|
| Patients (21) | Loc. 54  Seen |
| Lee, Danielle | White 10 |
| Marx, Fritz | White 9 |
| Mason, Jessica | Ellison 8   X |
| McCracken, Tony | White 7   X |
| Moore, Christine | Ellison 8 |
| Polk, Buck | White 7 |
| Riordan, Cathy | White 7   X |
| Smith, James | Bigelow 7   X |
| Thompson, Chloe | White 7   X |
| Add Patient | Remove Patient |

Change patient name:

First Name:

James

Last Name:

Smith

[ OK ] [ Cancel ]

Patient Location

Choose Patient Location

▼ Bigelow 7

[ OK ] [ Cancel ]

FIG. 5D

| Remove Patient | |
|---|---|
| Name | Acct # |
| Bradley, Lisa | 583218942 |
| Chan, Andrew | 923254587 |
| Chandler, Phoebe | 754287334 |
| Cobb, David | 485243590 |
| Fitch, Tiffany | 101649343 |
| Hanser, Guy | 983385124 |
| Johnson, Sarah | 573240310 |
| Jones, Thomas | 353924554 |
| Lee, Danielle | 483085484 |

[ Remove ] [ Cancel ]

| Remove Patient | |
|---|---|
| Name | Acct # |
| Bradley, Lisa | 583218942 |

Remove Patient

Are you sure that you wish to remove "Bradley, Lisa"? (The billing data will be submitted next time you dock.)

[ Yes ] [ No ]

Smith, James

86 — Dx 1 ▼ AI  5922144343
88 — Dx 2 ▼ (blank)  Bigelow 7

◄ [F1] [F3] [F2] [F3] [New]
   5-19 5-30 5-31 Today

Category: ▼ Follow-up: — 90

Follow-up: ▼ Level 3

Code: ▼ F3 (99233)

[Clear]
[Done] [Info] [Notes] [Guidelines]

FIG. 7D

Sn | Dyspned
   | HB
Dx | HTM      2214434
Dx | M        igelow 7
   | MI
◄  | MR       [New]
   | MS
   | MVP      oday
   | PAF      -up:
   | PE
   | RHD      3
   | SSS
 C | Takayasu's  233)
   | TIA
 D |          Guidelines

FIG. 7E

Smith, James

Dx 1 ▼ AI      |592214434|
Dx 2 ▼ (blank)     | Bigelow 7 |

◀ [F1] [F3] [F2] [F3] [New]

5-19

| Admission |
| Follow-up | — 92
| Consult |
| Follow-up Cons. |
| Observation |
| Disch. Day |
| Procedure |

[Clear]
[Done]

Smith, James

Dx 1 ▼ AI     |592214434|
Dx 2 ▼ (blank)     | Bigelow 7 |

◀ [F1] [F3] [F2] [F3] [New]
  5-19   5-30   5-31   Today

Category: ▼ Follow-up:

Follow-up: ▼ Level 3

Code: ▼ F3 (99233) ◁ — 97

96 — [Clear]
[Done] [Info] [Notes] [Guidelines]
  66    94    98    100

FIG. 7G

| Smith James | | —102 |
|---|---|---|

Acct. Number : 592214434
Location: Bigelow 7
Sex: M
Referring MD: Dr. M. Davis
Status: EW
DOB: 9/20/59
Admit Date: 5/16/99
Discharge Date: None
Dx1: AI
Dx2: (blank)

[Done] — 66

| Guidelines | Code: ▼A | —104 |

* Usual Time ~ 30 minutes.
  Document following 3:
HX —>      CC
           HPI (4+ elems.)
           ROS (2-9 system)
           1 of 3: Past, Family,
           Social hx
EXAM —>   2-7 organ systems.
A&P —>    2 of 3:
           Minimal # dx's./
           mgmt options:

[Back]            [Choose this Code]
110                          108

Notes for Smith.James — 112
Jan 23, 1999
cardiac murmur

Jan 24, 1999
diabetes

[Done] [Date]  Stock Phrases
  116         114

FIG. 10B

Notes for — admission date
Jan 23, 19  age-
cardiac m   blood sugar-
            bill-
            BP-
Jan 24, 19  BUN
diabetes    cardiac murmur
            CHF
            COPD
            creatinine-
            diabetes-
            diagnosis-
            K-
            PVD

[Done] [D
  66

FIG. 10C

| Options | Edit |
cardiac mu | Cut      ✓X
Jan 23, 19 | Copy     ✓C
           | Paste    ✓P
diabetes   | Undo     ✓U
Jan 24, 19 | Select All ✓S
           | Keyboard ✓K
           | Graffiti ✓G

FIG. 10D

Notes for Smith.James
Keyboard
diabetes
Jan 24, 1999 q w e r t y u i o p ←
→ a s d f g h j k l ; '
cap z x c v b n m , . ↵
shift    space     - /

[Done] [abc] [123] [Int'l]

DEVICE FOR AUTOMATING BILLING REIMBURSEMENT

RELATED APPLICATION(S)

This application claims the benefit of U.S. Provisional Application No. 60/100,333 filed on Sep. 15, 1998 and U.S. Provisional Application No. 60/093,446 filed Jul. 20, 1998, the entire teachings of which are incorporated herein by reference. A related application titled "System for Automating Billing Reimbursement" is being filed by Matthew D. Barnhart, Stephen S. Hau, Patrick McCormick, George Madrid, Craig A. Fields and Sanjay S. Vakil on even date herewith and is incorporated herein by reference.

BACKGROUND OF THE INVENTION

The typical physician billing system that is used in most hospitals includes a physician carrying 3"×5" cards, visiting a patient and afterwards assessing the extent of service performed and entering a diagnosis and procedure on the card, which determines the amount to be charged. The physician then provides the cards to the billing department. Although it sounds simple, there are many inefficiencies and hazards in this process that can result in unrealized revenue, lost revenue, and fines from healthcare insurance reimbursement agencies.

The card approach has documentation problems such as overbilling and underbilling. After seeing the patient, the physician typically documents the visit on the patient's medical chart. The physician then uses official billing guidelines to determine that these guidelines are confusing and change often. For example, a physician may confuse the difference between "Initial Inpatient Consultation" and "Confirmatory Consultation," or "Hospital Observation Services" and "Hospital Observation or Inpatient Care Services." A mistake in this determination can lead to denied reimbursement and a possible fine (up to $10,000) per transaction.

As another example, a physician may confuse levels 2 and 3 of "Initial Hospital Care." Both require documentation of a comprehensive patient history and a comprehensive exam. But level 3 requires "medical decision making of high complexity" while level 2 requires only "moderate complexity." A mistake in this choice can also lead to denied reimbursement and a possible fine.

What ultimately justifies the physician's reported category and level of service is the documentation he/she enters into the patient's record. The difference between a denied claim and a reimbursed one can be as simple as whether the physician examined nine body systems or ten. Physicians are expected to remember and abide by these micro-managing guidelines but typically cannot.

In order to avoid accidentally billing for too high a level of service, many physicians habitually underbill. That is, they always bill at the lowest level in order to ensure compliance with the guidelines and avoid fines. This results in a huge loss of revenue for physicians, clinics, and hospitals, because the difference in price between two levels of service can be $20 or more.

Further, the card system suffers from billing latency (or "charge lag") and lost cards. In an inpatient setting, a physician may have 35–40 patients whom the physician visits during rounds. For each patient, the physician carries a 3"×5" card—often using different coat pockets as a makeshift filing system—on which to record the category and level of service the physician performs each day.

The physicians have a habit of holding onto the paper cards for too long. They typically wait until patients are discharged (maybe after weeklong stays), and then actually submit the cards to the billing department at the end of that month. This long delay between the time of service and the time of billing card submission is known as "charge lag," and can average thirty-six days at many hospitals. That is a long period of time for a large amount of money to remain in the insurance companies' coffers rather than the hospital's. Of course, this assumes the physician has not already lost the card, in which case the charge is never submitted.

Lost charges from failure to enter information on cards are much like lost cards. Again, records of services and procedures performed do not reach billing personnel. In this case, it is simply because physicians have demanding schedules and it is often too inconvenient, difficult, or time-consuming to record billable events. When the appropriate form or chart is not easily available, many physicians will try to memorize what they've done and write it down later.

In summary, the existing paper-based billing card system has severe problems:

Overbilling: Billing for too high a level of service means no reimbursement, possible fines, and wasted time re-submitting the insurance claim at a lower service level.
Underbilling: Billing for too low a level of service, while ensuring compliance with official billing regulations, means losses at least $20 per patient per visit.
Late and lost cards: Reimbursement is unnecessarily delayed or does not occur.
Lost charges: Some billable events are never recorded.

SUMMARY OF THE INVENTION

The present invention relates to an apparatus for automating information processing and synchronizing information which is particularly suited to physician billing. The present invention solves the problems with existing paper-based billing card systems. The apparatus includes a handheld processing device to distribute information to an individual, collect information from individuals and manage information for individuals.

The electronic handheld processing device of the present invention which can be used with a system for automating the billing process includes patient related information, billing codes and guidelines. The device further has an interface to enable physicians to input billing and diagnosis information and an interface to communicate with an information system to send and receive updated information.

In a preferred embodiment, the patient information in the device can be sorted by different categories such as patient location. Billing code guideline changes can be flagged by an alarm to warn the physicians to check new updated guidelines. Further, billing code, medical procedures, evaluation and diagnosis menus are tailored to each physician.

In accordance with another aspect of the invention a bar code scanner is included in the handheld device. This scanner can be used for patient identification purposes as an alternative to picking from a list.

In accordance with another aspect of the present invention, a method for automating the billing process for physicians using an electronic handheld processing device includes displaying patient demographic information on a screen of the handheld processing device, displaying billing codes and guideline information on another screen, selecting the required patient and billing information once the patient has been examined and outputting billing code data to an interface device for distributing the billing code data to information systems for further processing to provide medical bills.

In another preferred embodiment, a list of patients to be seen on a particular day is displayed on the screen of the handheld processing device. Further, a list of patient locations in the hospital is also displayed on the screen of the handheld processing device. The physician enters a billing code selection corresponding to a patient examined.

In accordance with another aspect of the invention, a method for automating information processing includes electronically storing information in the handheld processing devices, indexing information by particular categories such as diagnosis, receiving updates of information and refreshing electronically stored information for easy access by a user.

The apparatus of the present invention has many applications, in the healthcare field, are in the legal field, in the financial field to name a few. For example, for the legal services, the present invention can assist automating the billing systems used by attorneys.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 5A–5D are views of the new patient screen as displayed on a handheld processing device.

FIGS. 6A–6B are views of the remove patient screen as displayed on a handheld processing device.

FIGS. 7A–7G are views of the billing card screen as displayed on a handheld processing device.

FIG. 8 is a view of the patient information screen as displayed on a handheld processing device.

FIG. 9 is a view of the guidelines screen as displayed on a handheld processing device.

FIGS. 10A–10D are views of the notes screen as displayed on a handheld processing device.

DETAILED DESCRIPTION OF THE INVENTION

The present invention relates to an apparatus for automating information processing and synchronizing information. This apparatus is particularly suited to physicians who traditionally carry 3"×5" cards while visiting patients and enter diagnosis and billing information on the cards to determine the amount to be charged. The present invention system which includes a handheld processing device replaces the 3"×5" cards and enables physicians to electronically enter the billing information, and to have access to current patient demographic information, billing codes, and billing guidelines. The physicians can sort the patient information by categories, such as patient location, to increase their efficiency.

The billing information as input by the physician is then downloaded to a synchronizing server via an interface device. The synchronizing server stores data and updates from the handheld processing device and forwards the information to an information system such as a hospital information system. The synchronizing server also stores data and updates from the information system for distribution to the handheld processing device. The synchronizing server efficiently distributes charges and updates between the handheld processing device and the information system enabling an automatic billing reimbursement system.

Figure 1:
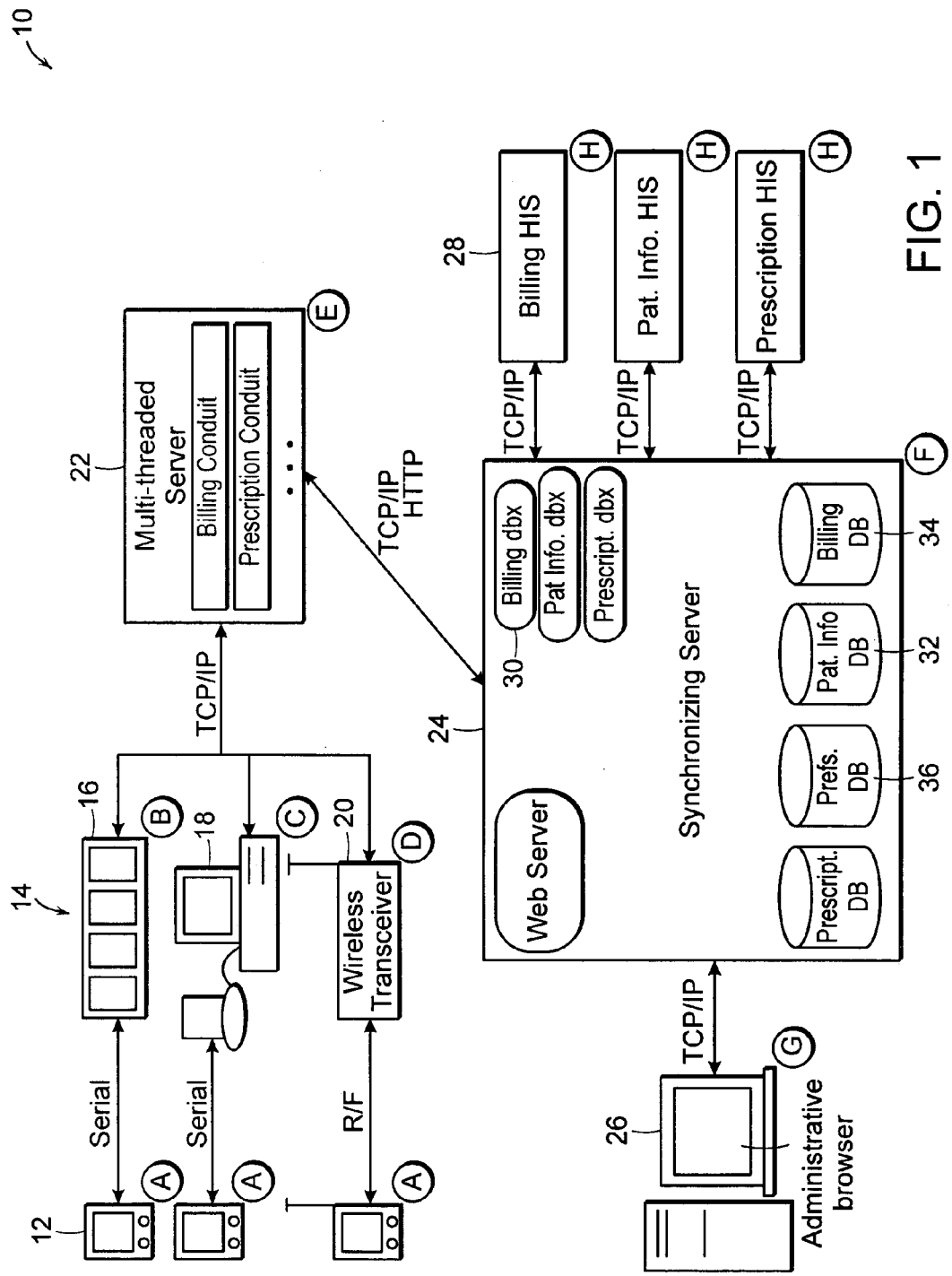
FIG. 1 is a schematic illustration of the system for automating billing reimbursement in accordance with the present invention.

FIG. 1 illustrates a preferred embodiment of the system 10 for automating billing reimbursement in accordance with the present invention. The handheld processing devices 12 can be off-the-shelf devices that each physician can configure and use as a personal unit. For example, the 3Com Palm Pilot 3, 3Com Palm III, IBM Workpad and Symbol SPT 1500, 1700 can be used.

The distributed handheld processing devices 12 are interfaced with the system 10, via interface devices 14 such as a cradle 16, a personal computer 18, or a wireless transceiver 20. These interface devices are placed throughout the hospital to allow doctors to transfer information at convenient locations. The interface devices 14, such as the cradles 16, require an Ethernet drop and alternating current (AC) power and convert from serial to transmission control protocol/internet protocol (TCP/IP). The users can also transfer information from their handheld processing devices using their own desktop machines 18.

Information from the interface devices 14 is then sent to and from a multi-threaded server 22. The information from the multi-threaded server 22 is transferred to and from a synchronizing server 24 via TCP/IP.

The synchronizing server 24 processes information and sends it to appropriate locations. The synchronizing server communicates via HTTP with a administrative browser 26 and the multi-threaded server 22 and with appropriate language to the hospital information system 28. Included in the synchronizing server 24 are database translators (dbx) 30 to communicate with the hospital information system 28. The synchronizing server maintains a local database of relevant patient information 32, current guidelines 34 and doctor preferences 36.

Figure 2:
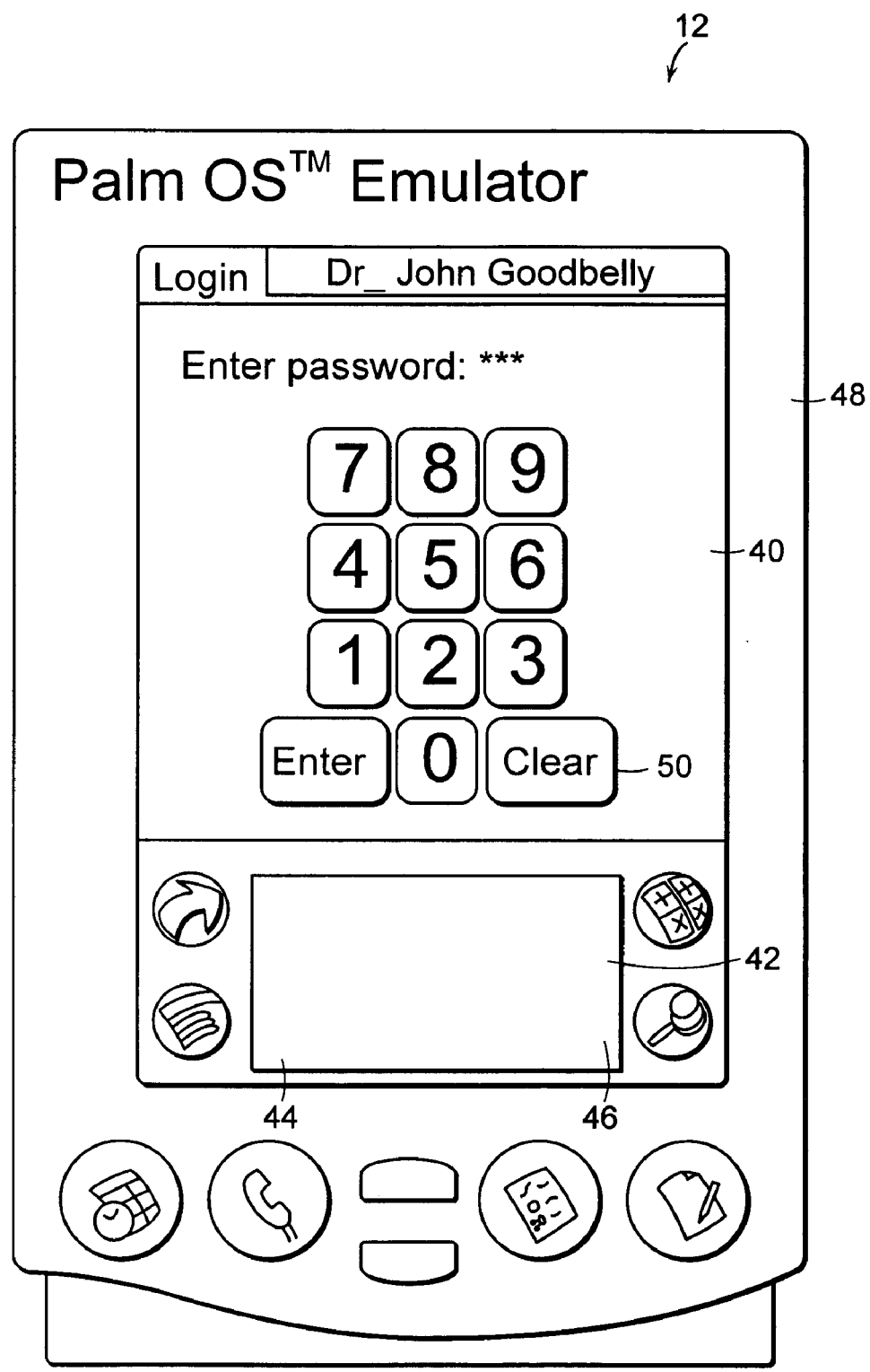
FIG. 2 is a view of a password screen as displayed on a handheld processing device.

Referring to FIG. 2, the interface of the handheld processing device 12 is straightforward. The user can interact with the handheld processing device 12 with a stylus that has a polished end. Using the stylus the user can "tap" on the pressure-sensitive screen, which is analogous to using a pen.

The pressure-sensitive screen on the handheld processing device is divided into two sections. The upper, larger part 40 has an LCD background where the handheld processing device displays information. The silk-screened lower section 42 of the screen is also pressure sensitive, but does not display.

In the bottom left of the silk-screened portion of the screen is the menu button. Tapping this menu button brings up a menu at the top of the screen, similar to menus found on desktop machines.

Many interactions with the handheld processing device require the use of pick lists. Pick lists have a label next to a triangle associated with the list. Tapping the triangle opens a list of items to choose from. Once the user taps on a selection, it will then appear next to the triangle. To change the user's selection, the user needs to tap the triangle again and reselect.

Most of the interaction the user has with the handheld processing device is by tapping. However, there may be times when the user needs to input text. There are two ways of inputting text and/or numerical information into the handheld processing device 12: tapping on the on-screen keyboard or using Graffiti. Graffiti is a stylized alphabet where letters are represented by a single pen-stroke. The user enters characters in the silk-screened area, for example, letters on the left and numbers on the right.

There are two ways to access the keyboard. In the silk-screened region 42 of the device there are two figures, "abc" 44 and "123," 46 in the bottom corners of the Graffiti input area. These buttons open the keyboard. Additionally, the user can use the menu system to bring up the keyboard. Note, that the handheld processing devices 12 have the ability to switch between a text keyboard, numeric keypad, and international letters. Alternatively, the user can use Graffiti. Choosing Graffiti from the Edit menu brings up a menu describing the pen-strokes associated with each letter.

While many handheld processing devices users find Graffiti greatly enhances their use of the handheld processing device, it is not necessary in order to use the device for automating billing reimbursement in accordance with the present invention.

Further in FIG. 2, a view of the password screen 48 as displayed on a handheld processing device 12 is illustrated. The Password Screen unlocks the application. The user must enter a password once a day. The user is prompted for the password the first time the program is used on any given day.

To use the screen, the user enters the password using the numeric keypad. The "Enter" button is tapped when the user is finished. If the user has forgotten the password, the user can inform the administrative office to have it changed. If the user has changed the password since docking last, the user will need to dock the handheld processing device 12 in an interface device 14 before the new password is provided. The operation of docking connects the handheld processing device, for example, to the hospital computer network, using the interface device. Docking transfers data from the handheld processing device into the hospital's computer system and updates the database on the device to reflect new guidelines, file patients' demographic information, or password changes.

The "Enter" button is pushed when the user has finished typing the password and is ready to enter the application. Tapping the "Clear" button 50 will clear the entry area.

Figures 3, 4A:
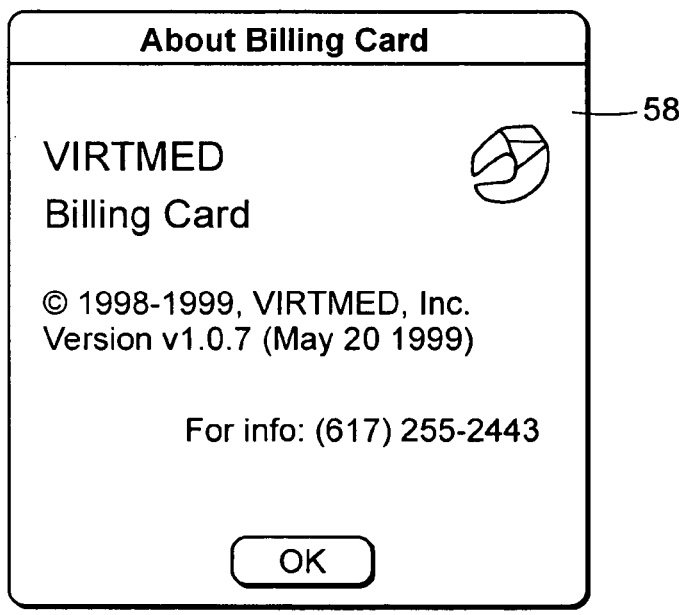
FIG. 3 is a view of a select patient screen as displayed on a handheld processing device.
FIGS. 4A–4C are views of different menus available from the select patient screen as displayed on a handheld processing device.

Referring to FIG. 3, a view of the Select Patient Screen 52 as displayed on a handheld processing device 12 is illustrated. The Select Patient Screen provides an overview of all the patients stored in the database. The list shows patient names, locations, and whether or not each patient has been seen that day. An "x" will appear in the "Seen" column if a billing code has been entered for the current day. It can be sorted by any of these criteria.

To use the Select Patient Screen 52, the user goes to the Billing Card Screen and taps the patient's row in the table. If there are more patients than can fit on the screen at one time, the user can scan through the list by either using the physical arrow buttons on the device or by using the scrollbar at the right-hand side of the screen. To sort the patients, the user taps the category title at the top of the column. For example, to sort by location, the user taps the "Loc" button 54 at the top of the location column. Sorting on the same location twice in a row reverses the order of the sort. An underline under the sort title indicates the current sort status. In FIG. 3 the patient list has been sorted by name. To add a new patient, the user taps the "Add Patient" button 56 in the bottom left of the screen. This takes the user to the New Patient Screen.

Figures 4B, 4C:

Referring to FIGS. 4A–4C, views of different menus for the Select Patient Screen as displayed on the handheld processing device are illustrated. Under options in the Menu system is the choice "About Billing Card" 58. This lists the version number, information on contacting VIRTMED™, as well as other information about the program. Also under the Options menu is the choice "Change Password." To change the user's password, the user is prompted to enter both the old password 60 and a new one 62.

If the user wants to change the location sorting order, the administrative browser at the interface device needs to be apprised. Once the administrative browser has the user's preferred order, the user's preferences are updated the next time the user docks.

Figure 5A:
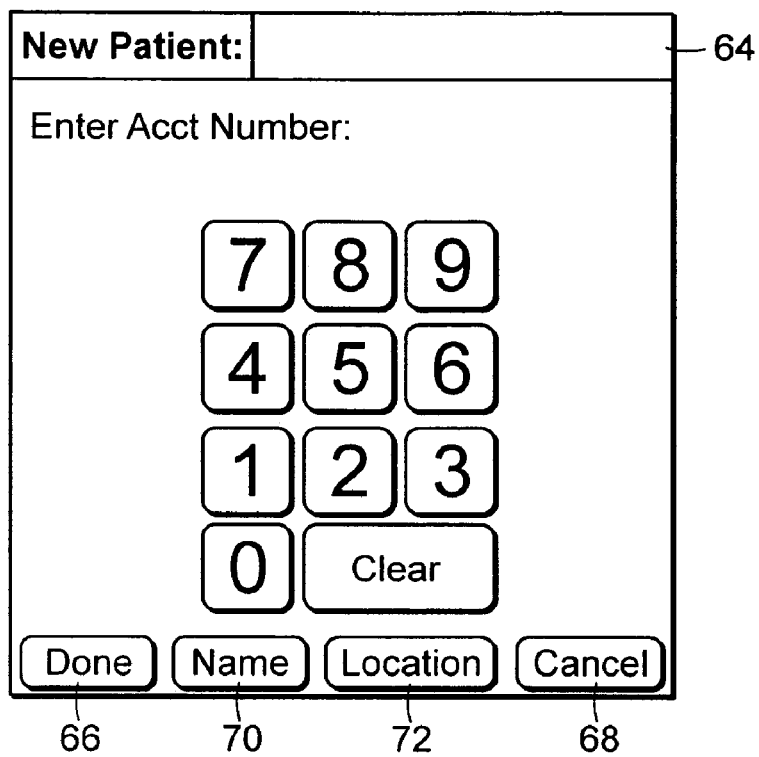

Referring to FIGS. 5A–5D, views of the New Patient Screen 64 as displayed on the handheld processing device 12 are illustrated. Once the user has tapped the "Add Patient" button in the Select Patient Screen, the New Patient Screen appears. The New Patient Screen as shown in FIG. 5A allows the doctor to enter new patients directly on the handheld processing device.

Using the New Patient Screen, the user can enter the Account Number for a new patient who is not already in the handheld processing device 12. Using the numeric keypad, the user enters the nine-digit Patient Account Number. The "Done" 66 button is tapped when the user is finished and returns to the Select Patient Screen.

Initially the only information on the new patient will be the Patient Account Number just entered. The rest of the patient's demographic information will be automatically entered into the user's handheld processing device the next time the handheld device 12 is docked on an interface device 14. Alternately, the user can enter the patient's name and location using the buttons.

Figure 5B:
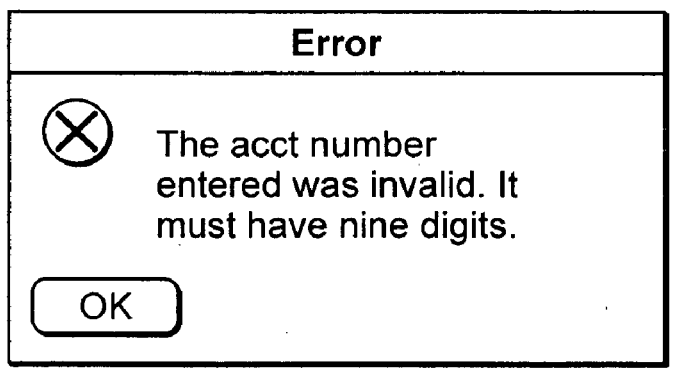
Figures 7A, 7B, 7C:
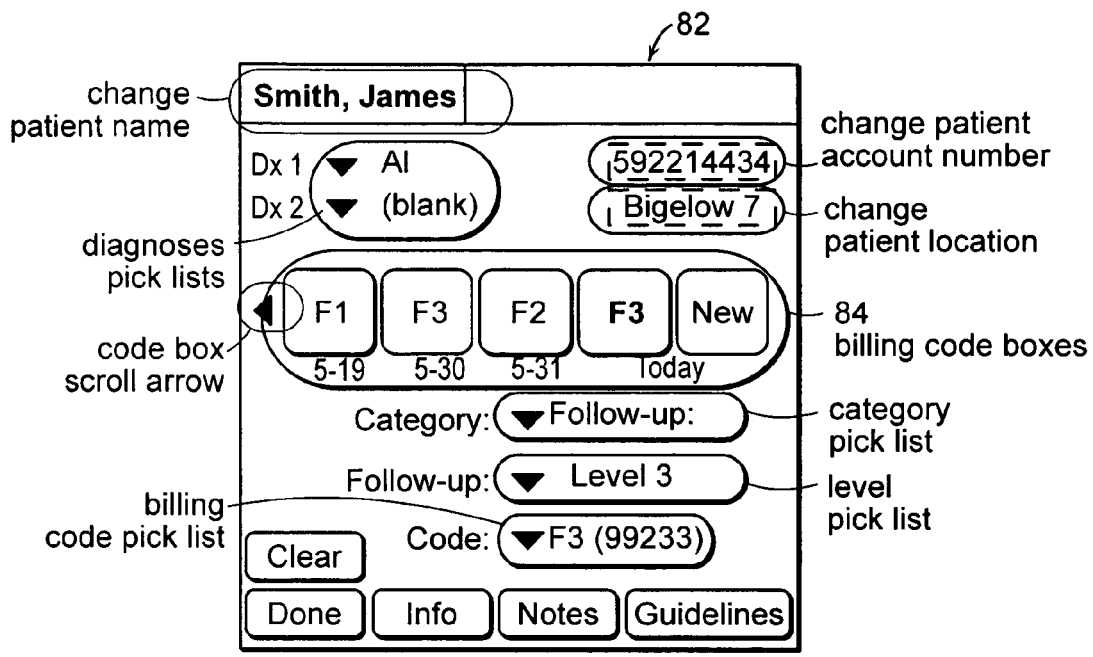

As an example, the Patient Account Number, must be nine digits long. If the user tries to enter a patient number that is not nine digits long, there will be an error message as shown in FIG. 5B.

The "cancel" button 68 is tapped to switch back to the Select Patient Screen 52 without entering a new patient. Tapping the "Clear" button clears the entry area. The "Done" button 66 switches back to the Selected Patient Screen. If the name was not entered, the new patient will be listed by number rather than name. Tapping the "Name" button 70 opens the Change Patient Name dialog box. The "Location" 72 opens the Patient Location dialog box.

Referring to FIGS. 6A and 6B, views of the Remove Patient screen 74 as displayed on the handheld processing device 12 are illustrated. Once the user has tapped the "Remove Patient" button 57 in the Select Patient Screen 52, the Remove Patient Screen will appear. The Remove Patient Screen 74 allows the doctor to remove patients from display on the handheld processing device 12. The data (billing information, etc.) that the user had entered for that patient will remain archived in the handheld device until passed through to the interface device 14 to the synchronizing server 24.

To use the Remove Patient screen 74, the user taps on the row containing the name and/or Account Number of the patient the user wishes to remove. If there are more patients than can fit on the screen at one time, the user can scan through the list by either using the physical arrow buttons on the device or by using the scrollbar at the right-hand side of the screen. The row will be highlighted.

Upon tapping the "Remove" button 76, the user is prompted for confirmation before removing the patient from their Patient List. Tapping the "Yes" button 78 confirms removing the patient, otherwise the user has to tap "No" 80. Tapping the "Done" button returns the user to the Select Patient Screen.

Referring to FIGS. 7A–7G views of the Billing Card Screen 82 as displayed on a handheld processing device 12 are illustrated. The Billing Screen 82 is where the actual billing information is recorded. Here, the user can view and edit all the billing codes entered for this patient, the patient's name, account number, location, and diagnoses.

The center of the Billing Card Screen contains the billing codes 84. Similar to the system on 3×5 index cards, each box represents one billing code. Underneath each box is the date corresponding to that code. If there are more boxes than can fit on the screen, scroll arrows will appear to the left and right of the row. If there is no code chosen for a particular day, a double dash appears in the center of that day's code box. If there is more than one code for a given day, the two code boxes will appear connected. In the screen displayed in FIG. 7A, 5–20 has one code while "today" has two boxes for codes.

Tapping the patient's name or location brings up a dialog box where the user can modify this data. Further, tapping to activate the Account Number brings up the Change Account Number Screen. Just as the user initially entered the Account Number in the New Patient Screen, the edited Account Number can be tapped in. After docking, the patient's name and Account Number cannot be changed. This feature preserves the integrity of the information inputted by the physician. No other user can make changes to the billing information once the information has been sent to the interface devices 14.

There is room on the billing screen for two diagnoses. To choose or change a diagnosis, the physician has to tap next to "Dx1" 86 or "Dx2" 88 as shown in FIG. 7D and a pick list appears. The physician taps the diagnosis to record or chooses "<blank>" for none. If a diagnosis the physician needs is not in the list, the physician can chose "<blank>" temporarily and inform the administrative browser. The physician's diagnosis list is updated the next time the handheld processing device 12 docks.

To enter a new code, the physician taps on the appropriate day's box. If there is no code yet recorded for that day, the physician can enter a new code. If the physician is adding an additional code for that day, the code box with the word "New" needs to be highlighted. If it is not highlighted, the physician needs to tap to activate it. Referring to FIG. 7D, "today" has just had its first code entered.

There is both a category and level associated with each billing code. First, the triangle 90 as shown in FIG. 7D next to "Category" is tapped and then a category from the pick list is chosen. Once the category is selected, a new pick list appears on the next line. In the same way the physician chooses the category, the physician can select the level from this new pick list.

Choosing both a category and a level identifies the billing code, which appears in the last of the three pick lists. The new code is now in the highlighted code box 92 as shown in FIG. 7F and another box, filled with "New," appears next to it. Alternatively, if the physician already knows the code the physician wants to use, it can be chosen directly from the code pick list without using either the category or level pick lists.

The "Info" button 94 as shown in FIG. 7G takes the user to the Patient Information Screen. Tapping the "Done" button 66 returns the user to the Select Patient Screen 52. The "Clear" button 96 clears the billing code for the selected code box. If the user taps the "Clear" button 96, the user will be prompted to ensure that the user wants to erase this information. The "Notes" button 98 takes the user to the Notes Screen where the user can optionally record additional information on the patient. Tapping the "Guidelines" button 100 takes the user to the Guidelines Screen where the user finds detailed documentation guidelines associated with the currently selected billing code. Billing code changes can be flagged 97 by an alarm to warn the physicians to check new guidelines.

Referring to FIG. 8, a view of the Patient Information Screen 102 as displayed on the handheld processing device 12 is illustrated. The Patient Information Screen 102 provides more extensive demographic information about the patient. Nothing on the screen, except the "Done" button 66, can be edited or tapped. Tapping the "Done" button 66 returns the user to the Billing Card Screen 82.

Referring to FIG. 9, a view of the Guidelines screen 104 as displayed on the handheld processing device 12 is illustrated. The Guidelines Screen 104 lets the user review the guidelines associated with billing codes. Checking the guidelines regularly helps the user bill at the appropriate level, rather than underbill or overbill (and risk fines).

Both the physical scroll buttons and the scrollbar allow the user to scroll up and down through each guideline. The physical scroll buttons on the device have an additional feature: they move continuously through the guidelines. For example, if the user is already at the bottom of a guideline, pressing the "Down" button moves the user to the next guideline. The pick list 106 next to label "Code": in the top right of the screen allows the user to quickly choose from the entire list of guidelines.

Tapping the "Choose This Code" button 108 returns the user to the Billing Screen 82, and changes the billing code for the selected code box to the code associated with the guideline just displayed on the screen. The "Back" button 110 returns the user to the Billing Screen 82 without changing the current code.

Under Edit in the Menu system, the user can choose to copy a selected area of text to the handheld processing device's clipboard. The user can then paste this information into the Notes Screen.

Referring to FIGS. 10A–10D, views of the Notes Screen 112 are illustrated. The Notes Screen allows the user to record any additional information that does not fit into the standard sections of a billing card. This is not intended to replace the patient's chart or to store information for the patient's record; it is simply a place for the user to jot down notes.

The user can enter notes by either tapping letters on the keyboard, using Graffiti, or choosing from the Stock Phrases pick list. If the text is too long to fit on a single screen, the user can either use the scroll bar or use the physical scroll buttons on the device to move around within the notes.

Often doctors use the same phrases when they are jotting notes on the backs of their cards. These have been gathered together and combined into the stock phrases pick list. Tapping the "Stock Phrases" button 114 will pop up the list, allowing the user to enter more frequently used phrases specific to the user without having to type them each time. If the user has more items to add to the stock phrases list, the user informs the administrative browser so that the user list will be updated the next time they dock.

The "Date" button 116 inserts a datestamp into the Notes screen. A calendar pops up and lets the user choose the particular date. The user also has the option of choosing the "Today" button 66 at the bottom of the calendar screen. Tapping the "Done" button 66 takes the user back to the Billing Screen 82.

To enter text, the user can use the on-screen keyboard. There are two ways to access the keyboard. As described hereinbefore, in the silk-screened region of the device there are two figures, "abc" 44 and "123" 46, next to the Graffiti input area. Tapping these figures opens the keyboard. Under the Edit menu, there are several choices. Once the user has highlighted some section of the Notes Screen by dragging the pen over the section of the screen the user wants to select, the user can edit the text using these edit commands.

Referring back to FIG. 1, the synchronizing server stores a plurality of databases including tables. The tables are encoded in universal remote locator (URL) text to be compatible with the standardized addressing scheme for accessing hypertext documents and other services using an administrative browser. Certain terms used in the database architecture herein have specific definitions. Many of these terms are used generically in the industry to represent certain concepts related to databases. The definitions as applied to the system and device for automating billing reimbursement are described herein. A table is a collection of records. A table can contain any number of records, including zero. A record is a collection of fields. There is at least one field in every record. A field is a pair of strings: the first representing the field name, the second representing the field value. This pair determines a mapping from the name to the value within the record. A name is an ascii string determining how a field is addressed. Names are unique within a particular record. Note that names beginning with the underscore character, '_', are restricted for internal use by the databases. A value is some arbitrary binary data associated with a name in a record.

A database is a collection of tables. A database can contain any number of tables, including zero. In practice, a database will contain a minimum of several tables, since the database configuration is stored in several administrative tables within the database itself. The database structure is defined as the "interrelationships" between tables. For example, the root table contains a list of all of the tables in the database. A template is a table in the database specifying the operations allowed and the specific methodology for each of those operations on another table.

Tables in the databases come in two configurations: regular and singlerec. Regular tables contain an arbitrary number of records, one per line, stored as ascii text. In this context, each field is separated by the ampersand character, '&'. Singlerec tables contain exactly one record. This allows the use of whitespace and comments in the file. comments are any line that begin with a hash character, '#'. Each field occurs on a line by itself in the standard format. Singlerec tables are used primarily for administrative reasons as a formatting aid to the administrator. Fields are stored in standard "equals" notations, name=value.

The database structure and therefore the synchronizing server 24, gains much of its power and flexibility through two mechanisms: first, it allows tables to specify their own interrelationships; second, it allows every table to operate in a different manner when performing its basic database operations. One of the primary functions of the synchronizing server 24 is to collect and assemble data from disparate and existing sources. These sources may consist of files, third-party databases, or even a web site. Each of these sources requires a different methodology for reading/writing/querying data. This is the primary problem which the synchronizing server solves.

Each table in the database has an associated "type". This type corresponds to a "template" which is just another table in the database. The template specifies which operations can be performed on the table, and how those operations are to be performed. A template has the following required fields:

_name: the name of the template. This name corresponds directly to the 'type' field which is specified in the target table.
_operations: a list of operations that can be performed on a table of this type.
_required: a list of required fields for every record in a table of this type. If a record is missing one or more of these fields, it will be rejected and not included in the table.

The operations field contains a list of operations which are defined and implemented for a table of the type corresponding to the template. Even the template type, itself, has a template.

Every "item" listed in the _operations field should have a corresponding "_item" field specified. Each of these specifies a list of actions which are required to perform that operation. For example, if only the "read" operation is specified for a template, that operation is performed using the basic "coreRead" function.

A slightly more complex template is excerpted below:
Handler definitions

_operations=read,login,access
_read=dbLock, dbRead
_login=login
_access=access This table type has three defined operations: read, login, and access. Login and access use the system standard functions, but read needs to do something special. In this example, read is pulling data from a third-party database. This database requires that the record be locked before it is used, only then can one read the actual data. So, when a record is read, the actions proceed from left to right; first the dbLock function is called, next the dbRead function is called.

Having a list of actions means that each operation is no longer atomic, i.e., it is no longer a self-contained action that can succeed or fail without affecting anything else. For example, if the dbLock action succeeded but the dbRead action failed, the record must be unlocked, or the database will be left in an inconsistent state. When an action fails, the action list is "unwound" from right to left. Each action is assumed to know how to "undo" itself in case there is a problem. Note that this template is just an example. A database would also have to define some sort of "unlock" operation to call after a successful read.

The following are operations and definitions corresponding to the operations of the synchronizing server database structure.

| | |
|---|---|
| login: | passed a user name and password, establishes what kinds of database accesses are allowed. |
| access: | used to establish a specific set of access mappings for tables |
| coreAdd: | generic add record function |
| coreRead: | generic read record function |
| coreWrite: | generic write record function |
| coreDelete: | generic delete record function |
| coreCommit1: | first stage commit for table changes. Causes the current state of the table to be written to disk, but does not yet replace the live table. |
| CoreCommit2: | done after the commit 1 call, replaces the live table with the updated table, once this has been done, the changes are visible to other users. |
| coreLock: | locks the table for exclusive access to make changes. When the table is locked, no other user can make changes, but can continue to read the original table. |
| coreUnlock: | unlocks the table |
| coreSync: | writes the time you first read the table to disk. This is used to keep track of what changes have and have not been seen for hotsyncs. CoreSync should be called once all of the currently modified records have been synced to the palm device. |
| coreVerifyLock: | verifies that the caller holds a lock on the database. |
| prefsHandler: | handles magic synchronization of the password (and potentially other fields) in the preferences database with the access control database. |
| patientRead: | used to ensure the local patient database is up-to-date. |
| billArchive: | used to archive billing information once it is deleted from the normal local database |
| billAdd: | sends new billing information to the HIS |

A table of tables is simply a table that contains one or more database records. A database record is simply a record that contains a "type" and "filename" field. The type field refers to the template which should be used for operations to the target table, and the filename indicates where to find the data in the targettable.

Table of maps is a table of tables, where one or more of the database records have a type field with the value "template". A template is a special database which specifies the database scheme for a table or group of tables. Templates are also sometimes called "maps". All tables have maps (or templates) which specify the structure and legal operations for the table.

A "shadow" table is one whose specification record contains a field "source". This field indicates the location where data should be found that is missing from the first table. Values in the shadow table override those in the parent. When a value is queried, the database structure looks it up in the table. If the value is not present, then the database structure will look for it in the source record (if such a record exists). The source record is a record in the source table with the same name as the shadow record. If a new value is added, then it is added to the shadow record, not to the source.

The implementation of both tables and records is straightforward. Each is simply an array of name-value pairs. A record associates names to strings. A table associates names to records. A database associates names to tables.

Figure 11:
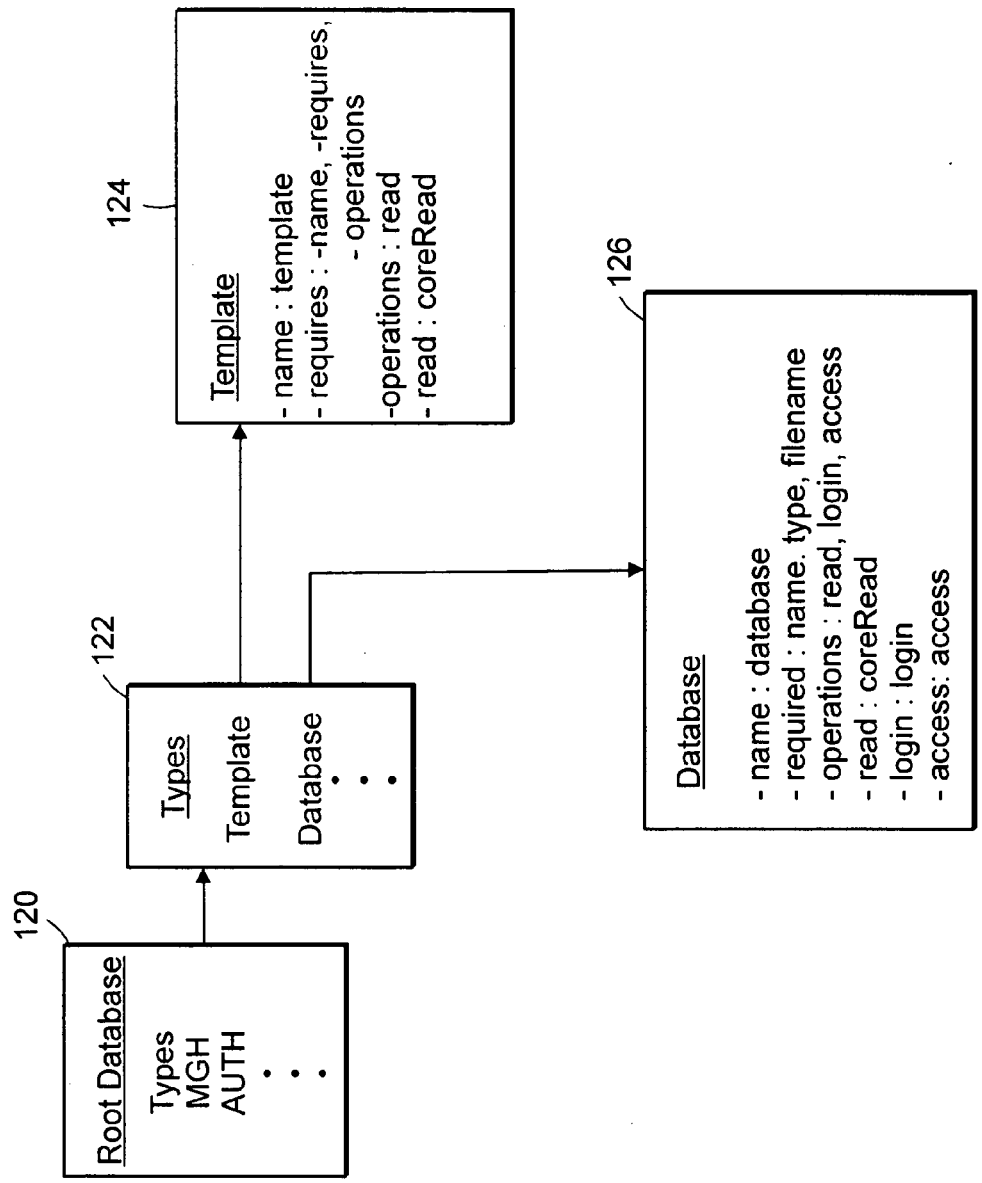
FIG. 11 is a block diagram illustrating the data structure in accordance with the system for automating billing reimbursement.

Referring to FIG. 11, the database structure in the synchronizing server 24 is composed mostly of arrays as this figure illustrates. RootDB 120 and Types 122 are both databases containing records. In the case illustrated, the records describe pointers to other databases. Template 124 and Database 126 are records containing an array of fields. A field is just a pair of strings representing the name and value.

Figure 12:
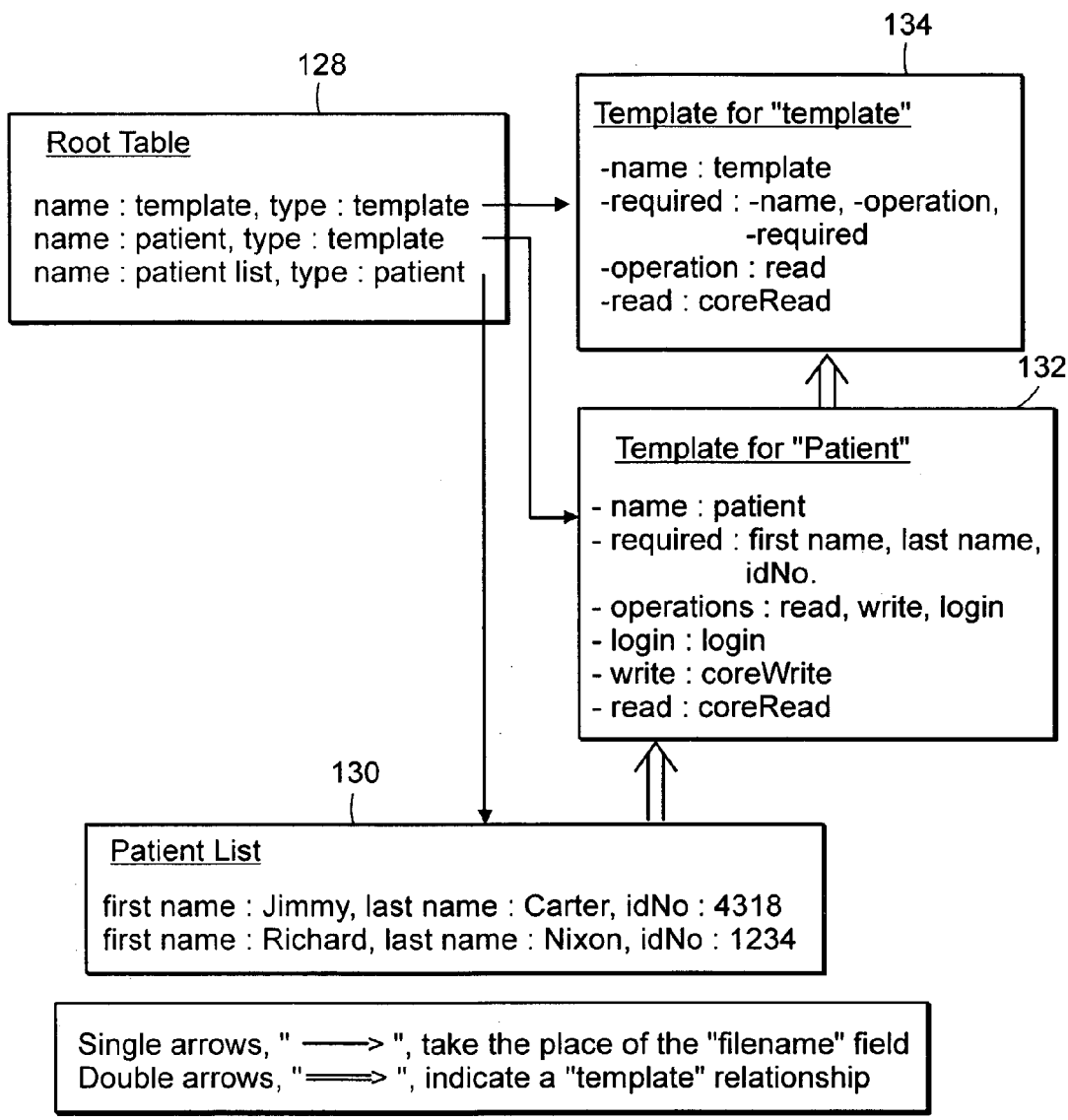
FIG. 12 is a block diagram illustrating the relationship between a table and a template in accordance with the database structure of the system for automating billing reimbursement.

FIG. 12 illustrates the relationship between a table and a template or a map showing three levels of data (four counting the root table 128). The root table is the first table in the data structure of tables. The file name of the root table can be hard-coded into the executable file of the synchronized server. The "template" for the root table can also be hardcoded. The database architecture of the synchronizing server comprises text files which represent tables. Interrelationships between tables are determined by linkages specified in the tables themselves. The hierarchy of the filesystem containing the files is exemplary and irrelevant to the scheme of the overarching interrelationships and is used primarily as an organizational aid for the administrator. "PatientList" 130 is a table of user data. It is described by the "patient" template 132 which describes the scheme of the user table. "Patient" is in turn described by "template" 134 which defines the scheme of the database structure internal data.

The root table is a table of tables (more precisely, a table of table descriptions). It points to three tables with data at each of the three different levels. Notice that no distinction is made between the tables. The different "levels" of data are indicated entirely by usage. Note also that even the root table 128 has a template; however, it is hard-coded into the implementation and cannot be changed.

Figure 13:
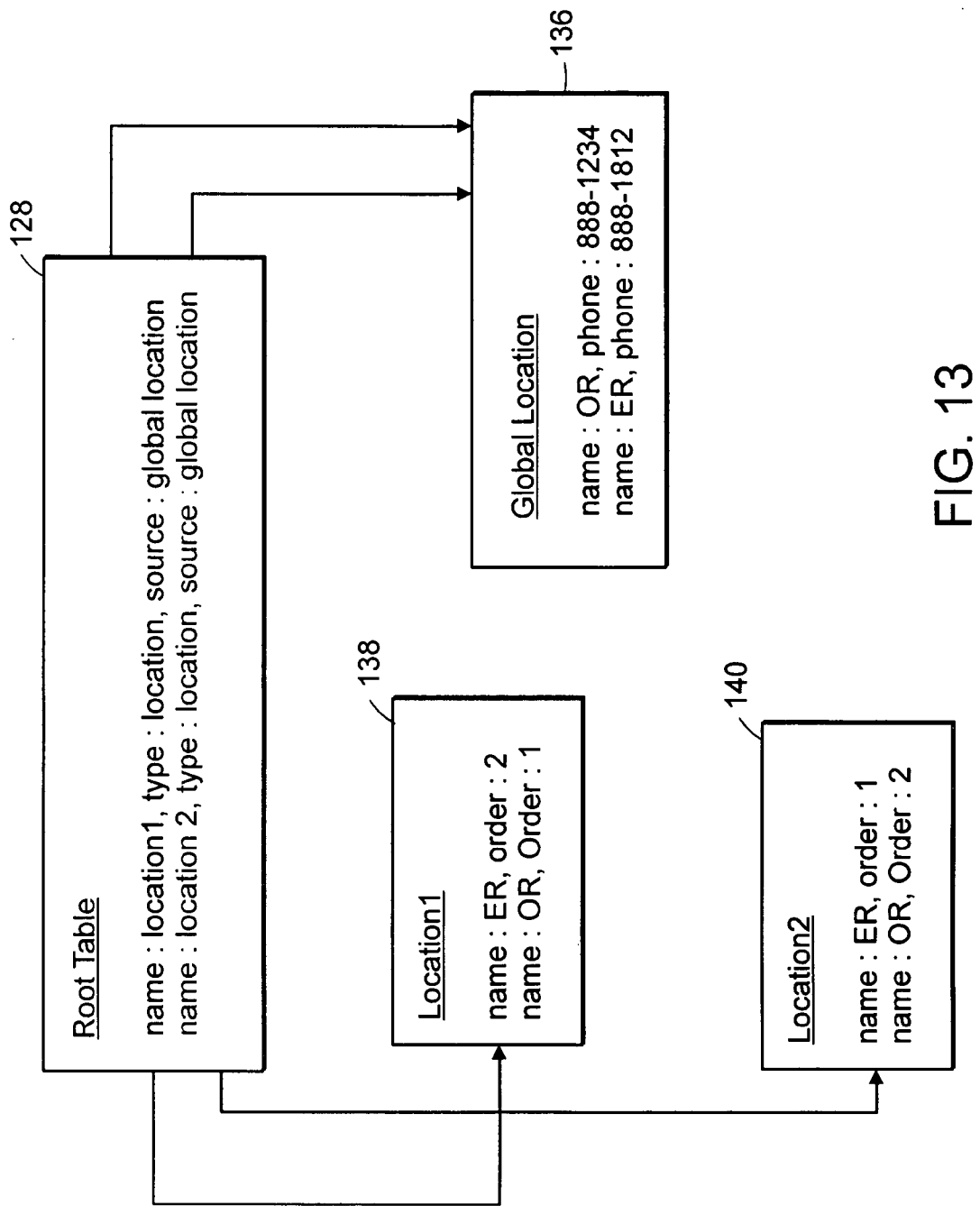
FIG. 13 is a block diagram illustrating the relationship between a shadow record and a source in accordance with the database structure of the system for automating billing reimbursement.

Referring to FIG. 13, an example of a shadow table is illustrated. Each doctor has a list of locations. Within this list, the doctor can specify his own "order" for visiting these location. However, the phone numbers are the same across the entire hospital.

To facilitate maintenance, the global data is stored in a table called "globalLocation" 136. Each of "location 1" 138 and "location 2" 140 is told where to find globalLocation 136, and if a value is not found in the location table itself, it will look to the source table, globalLocation, for the value. This architecture of using shadow tables makes implementing changes easy. For example, changing a phone number is easy once the value in the global location is changed; all of the doctors will be updated the next time they are synchronized or their handheld processing device interfaces with an interface device.

A synchronization server database holds the equivalent of the handheld device database for each physician. Some data can be considered global across the hospital. There is no reason to keep these tables separate for each physician. However, separate patient records must be kept for each doctor. Even if two physicians are seeing the same patient, the notes field would be individual to the physician. Also separate billing card data must be maintained for each physician. Billing code data must also be separate for each physician since the system updates billing codes and guidelines on a per-physician basis.

Figure 14:
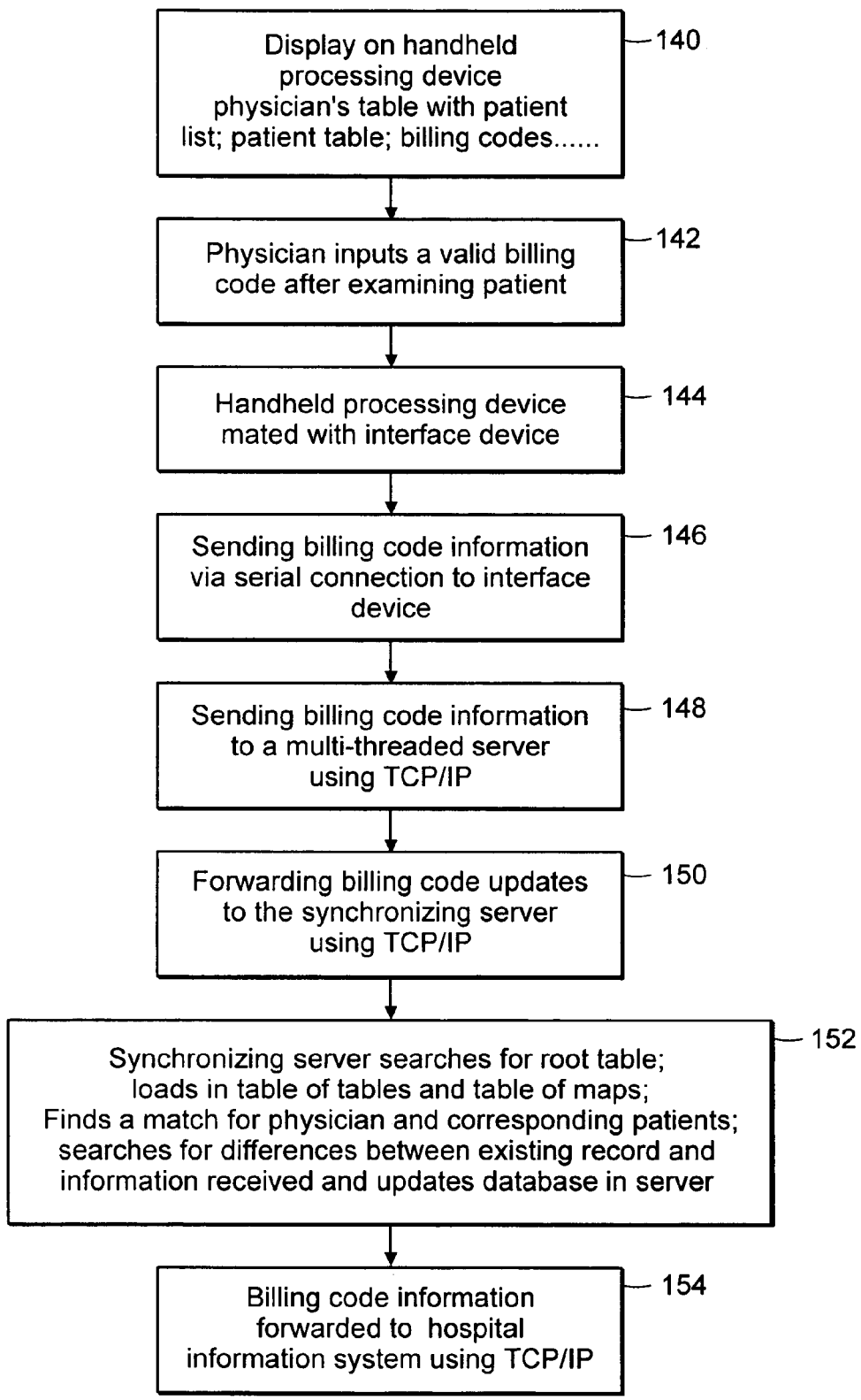
FIG. 14 is an exemplary flow chart illustrating the automatic billing reimbursement in accordance with the present invention.

FIG. 14 is an exemplary flowchart of an automatic billing reimbursement process in accordance with the present invention. A physician per step 140 displays different screens on a handheld processing device such as the specific physician's table, the patient list specific to the physicians, billing codes and billing guideline information. These displays are discussed in previous FIGS. 2–10. After examining the patient, the physician per step 142 inputs a valid billing code. After examining all patients for that current day, and after entering all the billing codes for the specific examinations, then physician mates the handheld processing device with specific interface devices 14. As discussed in FIG. 1, the interface device could either be an ethernet cradle 16, a desktop computer 18, or a wireless transceiver 20. The billing code information from the handheld processing device is sent using a serial connection to the interface device per step 146. The interface device then forwards the billing code information to the multi-threaded server using TCP/IP per step 148. In turn, per step 150 the multi-threaded server forwards the billing code information to the synchronizing server using TCP/IP. In step 152, upon receiving the billing code updates, the synchronizing server 24 searches for the root table. The table of tables and table of maps are loaded into the synchronizing server. The table of tables and the table of maps are searched to match the physician's table in order to match the physician's name who is sending in the billing code updates. Once the physician has been matched in the physician table, the physician's list of patients is accessed. Any changes that correspond to the particular patient are then updated in the synchronizing server databases. The billing code updates are then forwarded using TCP/IP to the hospital information system 28 using the database translators 30 per step 154. The hospital information system then uses the billing code updates to generate medical bills that are forwarded to the appropriate reimbursement agency. The administrative browser 24 constantly updates several databases in the synchronizing server. Databases such as the guidelines database, stock phrases database and billing code databases receive updated information from the administrative browser. The synchronizing server forwards these updates to the handheld processing devices 12 using the multi-threaded server 20 and the interface devices 14. The administrative browser can also generate different reports related to the billing systems such as total billing of a particular hospital over a particular time period or reports regarding doctor efficiencies.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of automating the billing process for a physician using an electronic handheld processing device, the method comprising:
coupling the handheld device to a server and transferring patient information specific to the physician and billing codes and associated guidelines specific to the physician to the handheld device;
while the handheld device is decoupled from the server:
displaying a patient list of multiple patients specific to the physician, the list displaying patient locations in the hospital, and displaying an indication of whether each patient has been seen that day, the patient list being sorted by the patient locations in the hospital;
displaying patient demographic information on a screen of the handheld device;
displaying billing information for individual patients on the screen of the handheld processing device;
entering patient and billing code information for a patient once the patient has been examined; and
displaying guidelines associated with the billing codes; and
coupling the handheld device to the server and outputting patient and billing code data to the server for distributing the billing code data to information systems for further processing to generate medical bills.

2. The method of claim 1, further comprising displaying guideline notifications for different billing codes.

3. The method of claim 1 wherein changes in guidelines associated with the billing codes are flagged.

4. The method of claim 1, further comprising displaying billing code and diagnosis menus specific to the physician.

5. The method of claim 4, further comprising displaying medical procedures and evaluation menus specific to the physician.

6. The method of claim 1 further comprising displaying a list of stock phrases specific to the physician for selection by the physician in entering notes.

7. A method of automating the billing process for a physician using an electronic handheld processing device, the method comprising:
coupling the handheld device to a server and transferring to the handheld device patient information specific to the physician and billing codes and associated guidelines and guideline updates specific To the physician;
while the handheld device is decoupled from the server:
displaying a patient list of multiple patients specific to the physician, the list including patient locations of the multiple patients in the hospital, and an indication of whether each of the multiple patients has been seen that day, the patient list being sorted by the patient locations in the hospital;
displaying patient demographic information on a screen of the handheld processing device;
displaying billing information for individual patients on the screen of the handheld processing device;
entering patient and billing code information for a patient once the patient has been examined; and
flagging billing code guideline changes to warn the physician to check new updated guidelines associated with the billing codes; and coupling the handheld device to the server and outputting patient and billing code data to the server for distributing the billing code data to information systems for further processing to generate medical bills.

8. The method of claim 7, further comprising displaying guideline notifications for different billing codes.

9. The method of claim 7, wherein the changes in guidelines associated with the billing codes are flagged by an alarm.

10. The method of claim 7, further comprising displaying billing code and diagnosis menus specific to the physician.

11. The method of claim 10, further comprising displaying medical procedures and evaluation menus specific to the physician.

12. The method of claim 7, wherein the patient information is sorted by patient locations in the hospital.

13. The method of claim 7 further comprising displaying a list of stock phrases specific to the physician for selection by the physician in entering notes.

* * * * *

UNITED STATES PATENT AND TRADEMARK OFFICE
CERTIFICATE OF CORRECTION

| | | |
|---|---|---|
| PATENT NO. | : 7,110,955 B1 | Page 1 of 1 |
| APPLICATION NO. | : 09/356543 | |
| DATED | : September 19, 2006 | |
| INVENTOR(S) | : Matthew D. Barnhart et al. | |

It is certified that error appears in the above-identified patent and that said Letters Patent is hereby corrected as shown below:

Title Page Item (75), First Inventor's name "Barhnart" should be -- Barnhart --; and Claim 7, line 50 "To"- should be --to--.

Signed and Sealed this

Seventeenth Day of July, 2007

JON W. DUDAS
*Director of the United States Patent and Trademark Office*